United States Patent Office 3,347,850
Patented Oct. 17, 1967

3,347,850
CERTAIN 3-DITHIOPHOSPHORYLACETYL-3-AZA-
BICYCLO[3,2,2]NONANE COMPOUNDS
Don R. Baker, Pinole, Mervin E. Brokke, Richmond, and
Duane R. Arneklev, Sunnyvale, Calif., assignors to
Stauffer Chemical Company, New York, N.Y., a corporation of Delaware
No Drawing. Filed Mar. 4, 1966, Ser. No. 531,786
4 Claims. (Cl. 260—239)

This application is a continuation-in-part of Ser. No. 494,235 filed Oct. 8, 1965.

This invention relates to certain new and novel organic compounds which may be used as effective herbicides. More specifically, the invention relates to certain azabicyclononanes and to the use of said compounds in herbicidal compositions.

The compounds comprising the instant class correspond to the general formula

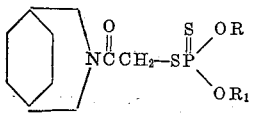

wherein R and $R_1$ are selected from the group consisting of lower alkyl and lower alkoxyalkyl. By "lower" in the foregoing expression is included alkyl radicals having one to five carbon atoms.

The compounds herein contemplated can be prepared by several methods.

The substituted-dithiophosphorylacetyl derivatives were prepared by condensation of the chloroacetyl azabicyclononane and the alkali metal substituted-dithiophosphate. The above described general method proceeds rapidly in the liquid phase. The employment of an inert organic solvent is also useful, facilitating processing as well as agitation of the reactants. Temperatures that permit operation in the liquid phase and which allow controllable reaction conditions are employed.

It has been found that the compounds of the present invention are particularly effective as herbicides. They are effective in the control of the growth of grasses and broadleaf plants with both pre-emergence and post-emergence activity.

The compounds of the present invention may be made in accordance with the following example.

EXAMPLE 1

*Preparation of 3-(2-O,O-diisopropyldithiophosphoryl-acetyl)-3-azabicyclo(3·2·2)nonane*

A mixture of 10.1 g. of 3-chloroacetyl-3-azabicyclo-(3·2·2)-nonane and 20 g. of potassium diisopropyl dithiophosphate in 100 ml. of benzene and 100 ml. of water was stirred and heated under reflux for three hours. The benzene layer was separated, washed with water, dried over anhydrous magnesium sulfate and evaporated under reduced pressure. There was obtained 11.0 g. of the title compound, $n_D^{30} = 1.5395$.

The following is a table of the above and additional compounds prepared according to the aforedescribed procedure. Compound numbers have been assigned to each compound and are used then for identification throughout the balance of the application.

TABLE I

| Compound Number | R | $R_1$ | M.P. or $n_D^{30}$ |
|---|---|---|---|
| 1 | $(CH_3)_2CH-$ | $(CH_3)_2CH-$ | 1.5395. |
| 2 | $C_2H_5$ | $C_2H_5$ | (Semi-solid). |
| 3 | $CH_3OC_2H_4-$ | $CH_3OC_2H_4-$ | 1.5387. |

As previously mentioned, the herein described novel compositions produced in the above described manner are phytotoxic compounds which are useful and valuable in controlling various plant species. The compounds of this invention were tested as herbicides in the following manner.

*Pre-emergence herbicide test.*—The seeds of crab grass, annual bluegrass, watergrass, red oats, pigweed, mustard and curly dock were planted in individual rows one-half inch deep in Santa Cruz sandy loam soil contained in compressed paper flats 8¼″ x 6½″ which are 2¾″ deep. Enough seeds were planted to give about thirty to fifty plants of each of the weed species in each flat. The flats were watered after planting. The following day each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later the degree of weed control was determined by comparing the amount of germination and growth of each weed in the treated flats with weeds in several untreated control flats. The results of this test are reported in Table II.

TABLE II
[Pre-emergence activity rate, 20 lbs./A.]

| Compound Number | Crab grass | Annual bluegrass | Water grass | Red oats | Pigweed | Mustard | Curly Dock |
|---|---|---|---|---|---|---|---|
| 1 | +++ | +++ | +++ | | +++ | +++ | |
| 2 | +++ | +++ | +++ | +++ | +++ | +++ | + |
| 3 | +++ | | +++ | | +++ | + | + |

+=Slight injury.   ++=Moderate injury.   +++=Severe injury or death.

*Post-emergency herbicide test.*—The seeds of five weed species, crabgrass, watergrass, red oats, mustard, curly dock, and one crop, pinto beans (*Phaseolus vulgaris*) were planted in individual rows as described in the pre-emergence test, supra. Two weeks after planting the plant foliage was sprayed with a solution of the test compounds at a rate equivalent to 12.5 pounds/acre. The treated plants were placed back in the greenhouse. Injury ratings were recorded 14 days after treatment. The rating system is the same as that used in the pre-emergence test. Table III lists the results obtained therefrom.

TABLE III

[Post-emergence activity rate, 12.5 lbs./A.]

| Compound Number | Crab grass | Water grass | Red oats | Mustard | Curly dock | Pinto bean |
|---|---|---|---|---|---|---|
| 1 | ++ | ++ | + | +++ | + | +++ |
| 2 | ++ | ++ | + | +++ | + | +++ |
| 3 | +++ | ++ | + | +++ | + | +++ |

On further evaluation of pre-emergence activity, Compound Number 2 exhibited 90% or better control on the four grass species at 2 lbs. per acre.

Additionally the compounds of the present invention were found to be grass growth retardants when applied as a post-emergence spray to the grass. The compounds may be applied to either the soil or to the plant foliage; preferably the compounds are used as a drench applied to the soil. Application may vary from about 4 to about 10 lbs./A. Employment of an agent as a grass growth retardant allows extended periods between grass cutting periods, while maintaining favorable landscape conditions.

The compounds of the present invention may be used as pre-emergence or post-emergence herbicides and may be applied in a variety of ways at various concentrations.

In practice the compounds are usually formulated with an inert herbicidal adjuvant, utilizing methods well-known to those skilled in the art, thereby making them suitable for application as dusts, sprays, or drenches. The amount applied will depend upon the nature of the seeds or plants to be controlled and the rate of application may vary from 1 to 50 pounds per acre. One particularly advantageous way of applying the herbicidal composition comprising the adjuvant and an effective amount of a compound of the present invention is a narrow band along a row crop, straddling the row.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. A compound of the formula

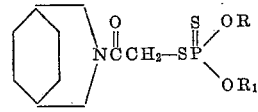

wherein R and $R_1$ are selected from the group consisting of lower alkyl and lower alkoxyalkyl.

2. A compound as stated in claim 1 wherein R and $R_1$ are ethyl.

3. A compound as stated in claim 1 wherein R and $R_1$ are methoxyethyl.

4. A compound as stated in claim 1 wherein R and $R_1$ are isopropyl.

References Cited

Smith, J. Org. Chem., vol. 28, pp. 863–865 (1963).

ALTON D. ROLLINS, *Primary Examiner.*